United States Patent
Al Jarri et al.

(10) Patent No.: US 11,868,478 B2
(45) Date of Patent: Jan. 9, 2024

(54) SYSTEM AND METHOD UTILIZING MACHINE LEARNING TO PREDICT SECURITY MISCONFIGURATIONS

(71) Applicant: Saudi Arabian Oil Company, Dhahran (SA)

(72) Inventors: Johara Abdulrahman Al Jarri, Dammam (SA); Aasim Ajaz, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 325 days.

(21) Appl. No.: 16/876,974

(22) Filed: May 18, 2020

(65) Prior Publication Data
US 2021/0357506 A1  Nov. 18, 2021

(51) Int. Cl.
*G06F 21/57* (2013.01)
*G06N 20/00* (2019.01)
*G06F 11/30* (2006.01)

(52) U.S. Cl.
CPC ........ *G06F 21/577* (2013.01); *G06F 11/3065* (2013.01); *G06N 20/00* (2019.01)

(58) Field of Classification Search
CPC .... G06F 21/577; G06F 11/3065; G06N 20/00
See application file for complete search history.

(56) References Cited

U.S. PATENT DOCUMENTS

| | | | | |
|---|---|---|---|---|
| 8,683,546 B2* | 3/2014 | Dunagan | ............... | G06F 21/577 726/1 |
| 10,560,370 B1* | 2/2020 | A | ............... | H04L 45/28 |
| 10,795,984 B1* | 10/2020 | Rafferty | ............... | G06F 21/32 |
| 11,269,974 B1* | 3/2022 | Chaudhuri | ............... | G06Q 30/0241 |
| 11,270,785 B1* | 3/2022 | Talvola | ............... | G16H 50/30 |
| 11,335,461 B1* | 5/2022 | McNair | ............... | G06N 20/00 |
| 11,341,429 B1* | 5/2022 | Pihur | ............... | G06N 5/04 |
| 2015/0081599 A1* | 3/2015 | Dobler | ............... | G01R 31/00 706/12 |

(Continued)

FOREIGN PATENT DOCUMENTS

| | | |
|---|---|---|
| CN | 109558910 A | 4/2019 |
| GB | 2568115 A | 5/2019 |
| WO | 2018126226 A1 | 7/2018 |

*Primary Examiner* — Stephen T Gundry
(74) *Attorney, Agent, or Firm* — Leason Ellis LLP

(57) ABSTRACT

Configuration monitoring is performed using a computer-based system and method by identifying misconfigured settings through the collection of large amounts of configuration data from diverse sources. The configuration data is then analyzed to identify misconfigured items. Automation of such configurations is implemented using machine learning to analyze existing configurations as well as new configurations. By using machine learning, the computer-based system and method can predict a pass state or a fail state of the configuration of a newly connected system in an organization. A logistic regression classifier is trained using old complying configuration data and data reflecting industry standards. The trained classifier can predict and classify whether a new configuration passes or fails the industry standards based on the training data of old configuration data. The computer-based system and method using the trained classifier generate and output a report indicating a pass or fail state of the new configuration.

17 Claims, 3 Drawing Sheets

(56) References Cited

U.S. PATENT DOCUMENTS

| | | | |
|---|---|---|---|
| 2015/0379034 A1* | 12/2015 | Apte | G06F 9/44505 707/754 |
| 2016/0127465 A1* | 5/2016 | Barstow | G06F 16/273 707/620 |
| 2016/0155069 A1* | 6/2016 | Hoover | G06Q 30/06 706/12 |
| 2018/0091531 A1* | 3/2018 | El-Moussa | G06N 3/08 |
| 2018/0189325 A1* | 7/2018 | Hohwald | G06F 16/5838 |
| 2018/0308026 A1* | 10/2018 | Sinha | G06Q 10/0635 |
| 2018/0375892 A1* | 12/2018 | Ganor | H04L 63/20 |
| 2019/0354881 A1* | 11/2019 | Rosler | H04L 63/1433 |
| 2021/0150409 A1* | 5/2021 | Dalgaty | G06N 20/00 |
| 2021/0150416 A1* | 5/2021 | Ghanea-Hercock | G06N 20/20 |
| 2021/0157562 A1* | 5/2021 | Sethi | G06F 9/453 |
| 2021/0158204 A1* | 5/2021 | Natesan Ramamurthy | G06N 20/00 |
| 2021/0166822 A1* | 6/2021 | Bendersky | G06N 5/04 |
| 2021/0196428 A1* | 7/2021 | Upadhyay | A61C 7/002 |
| 2021/0201209 A1* | 7/2021 | Sghiouer | G06N 20/00 |
| 2021/0201412 A1* | 7/2021 | Goh | G06Q 40/02 |
| 2021/0209247 A1* | 7/2021 | Mohassel | A63B 21/222 |
| 2021/0209507 A1* | 7/2021 | Zafar | A61B 5/02 |
| 2021/0232473 A1* | 7/2021 | Laskawiec | G06F 11/3051 |
| 2021/0241200 A1* | 8/2021 | Carricato | G06F 16/288 |
| 2021/0248458 A1* | 8/2021 | Robert-Régol | G06F 16/9024 |
| 2021/0256436 A1* | 8/2021 | Nag | G06F 16/3334 |
| 2021/0279562 A1* | 9/2021 | Cmielowski | G06N 20/10 |
| 2021/0287119 A1* | 9/2021 | Rink | G06Q 30/0201 |
| 2021/0303937 A1* | 9/2021 | Sakamoto | G06F 18/2411 |
| 2021/0303970 A1* | 9/2021 | Ma | G06Q 40/125 |
| 2021/0319899 A1* | 10/2021 | Liu | A61B 5/055 |
| 2021/0327594 A1* | 10/2021 | Shukla | G06N 5/047 |
| 2021/0342204 A1* | 11/2021 | Choudhury | G06F 11/008 |
| 2021/0343411 A1* | 11/2021 | Zhang | G06N 5/045 |
| 2021/0349811 A1* | 11/2021 | Quemy | G06F 11/3684 |
| 2021/0350181 A1* | 11/2021 | Navratil | G06N 20/00 |
| 2021/0360406 A1* | 11/2021 | Heiland | H04L 41/16 |
| 2021/0382775 A1* | 12/2021 | Li | G06F 11/0751 |
| 2022/0058528 A1* | 2/2022 | Murakonda | G06F 40/30 |
| 2022/0066456 A1* | 3/2022 | Ebrahimi Afrouzi | B25J 9/1697 |
| 2022/0092216 A1* | 3/2022 | Mohassel | G06N 3/084 |
| 2022/0092346 A1* | 3/2022 | Jones | G06V 10/751 |
| 2022/0148695 A1* | 5/2022 | Boussios | G06N 20/00 |
| 2022/0245574 A1* | 8/2022 | Cella | G06F 9/451 |
| 2022/0334115 A1* | 10/2022 | McDevitt | G01N 33/57496 |
| 2022/0366078 A1* | 11/2022 | Kirti | G06F 21/6245 |

* cited by examiner

SYSTEM AND METHOD UTILIZING MACHINE LEARNING TO PREDICT SECURITY MISCONFIGURATIONS

FIELD OF THE DISCLOSURE

The present disclosure relates generally to cybersecurity, and, more particularly, to a system and method utilizing machine learning to predict security misconfigurations for cybersecurity.

BACKGROUND OF THE DISCLOSURE

Cybersecurity is an essential component of organizations having computer systems, which manage the assets of an organization. Such computer systems have security configurations which are implemented by configuration data, often stored in configuration files. A security configuration ensures that a device is well secured before the device goes into production and stays secure throughout the lifecycle of the device.

However, the default configuration of operating systems, computer applications, and network devices are typically not oriented toward security. Basic controls do not provide the best protection against cyberattacks, and also fail to comply with industry-wide security regulations, such as PCI, SOCX, GDPR, HIPPA, CIS, NIST, and ISO 27001.

SUMMARY OF THE DISCLOSURE

According to an embodiment consistent with the present disclosure, configuration monitoring is performed by identifying misconfigured settings through the collection of large amounts of configuration data from diverse sources. The configuration data is then analyzed to identify misconfigured items. Automation of such configurations is implemented using machine learning to analyze existing configurations as well as new configurations. By using machine learning, the computer-based system and method can predict a pass state or a fail state of the configuration of a newly connected system in an organization. A logistic regression classifier is trained using old complying configuration data as training data. Data reflecting industry standards is also used to train the classifier. The trained classifier can predict and classify whether a new configuration passes or fails the industry standards based on the training data of old configuration data. The computer-based system and method using the trained classifier generate and output a report indicating a pass or fail state of the new configuration.

In an embodiment, a method comprises receiving training configuration data, security standards data, and new configuration data at an input device; training a predictor module of a processor using the training configuration data and the security standards data to perform a logistic regression; generating a classification of the new configuration data as having a pass state or a fail state; and outputting a classification report including the classification at an output device indicating the pass state or the fail state of the new configuration data. The method further comprises storing the training configuration data, the security standards data, and the new configuration data in a database. The output device outputs the pass state or the fail state in a pass/fail compliance report as the classification report. Alternatively, the security standards data includes a predetermined framework; and the output device outputs the pass state or the fail state in a framework compliance report as the classification report, with the pass state or the fail state being relative to the predetermined framework. The method further comprises adding the new configuration data to the old configuration data and retraining the predictor module with the new configuration data and the old configuration data to update the logistic regression of future configuration data.

In another embodiment, a classifier comprises a processor having a predictor module, trained by training configuration data and security standards data to perform a logistic regression, for receiving new configuration data and for generating a classification of the new configuration data as having a pass state or a fail state; and an output device outputting a classification report including the classification indicating the pass state or the fail state of the new configuration data. The classification report is a pass/fail compliance report. Alternatively, the security standards data includes a predetermined framework; and the output device outputs the pass state or the fail state in the classification report as a framework compliance report with the pass state or the fail state being relative to the predetermined framework. The processor adds the new configuration data to the old configuration data and retrains the predictor module with the new configuration data and the old configuration data to update the logistic regression of future configuration data.

In a further embodiment, a system comprises an input device for receiving training configuration data, security standards data, and new configuration data; a processor including a predictor module, trained by the training configuration data and the security standards data, to perform a logistic regression for generating a classification of the new configuration data; and an output device outputting a classification report including the classification. The output device is a display for displaying the classification report. The system further comprises a database for storing the training configuration data, the security standards data, and the new configuration data. The classification is a binary classification. The classification includes one of a pass state and a fail state of the new configuration data. The output device outputs the pass state or the fail state in a pass/fail compliance report as the classification report. Alternatively, the security standards data includes a predetermined framework; and the output device outputs the pass state or the fail state in a framework compliance report as the classification report, with the pass state or the fail state being relative to the predetermined framework. The processor adds the new configuration data to the old configuration data and retrains the predictor module with the new configuration data and the old configuration data to update the logistic regression of future configuration data.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a computer-based configuration monitoring system and method, in which configuration monitoring is performed by identifying misconfigured settings through the collection of large amounts of configuration data from diverse sources. The configuration data is then analyzed to identify misconfigured items. Automation of such configurations is implemented using machine learning to analyze existing configurations as well as new configurations. By using machine learning, the computer-based system and method can predict a pass state or a fail state of the configuration of a newly connected system in an organization. A logistic regression classifier is trained using old complying configuration data as training data. Data reflecting industry standards is also used to train the classifier. The trained classifier can predict and classify whether a new configuration passes or fails the industry standards based on the training data of old configuration data. The computer-based system and method using the trained classifier generate and output a report indicating a pass or fail state of the new configuration.

Figure 1:
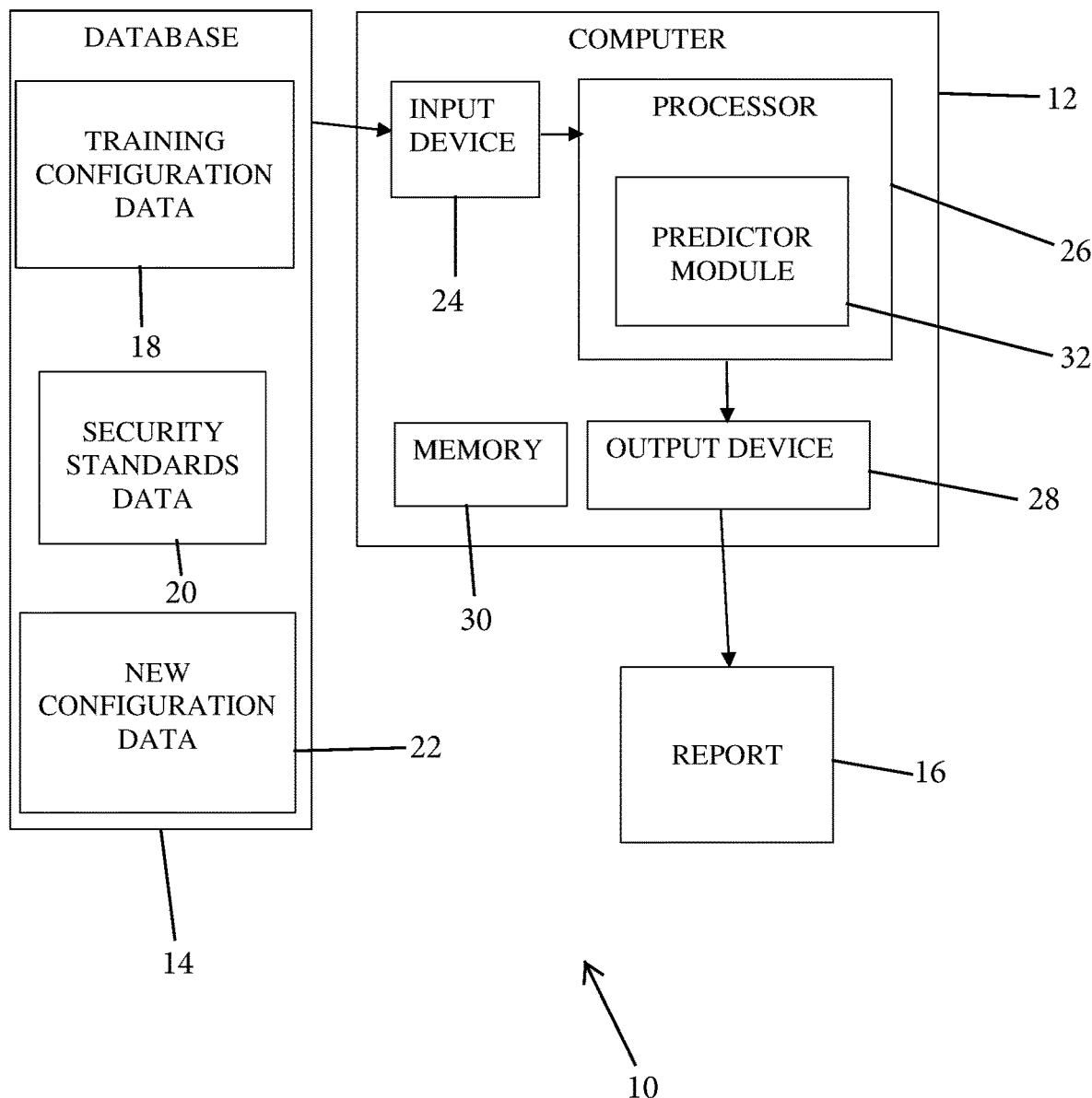
FIG. 1 illustrates a diagram of a system, according to an embodiment.
Figure 2:
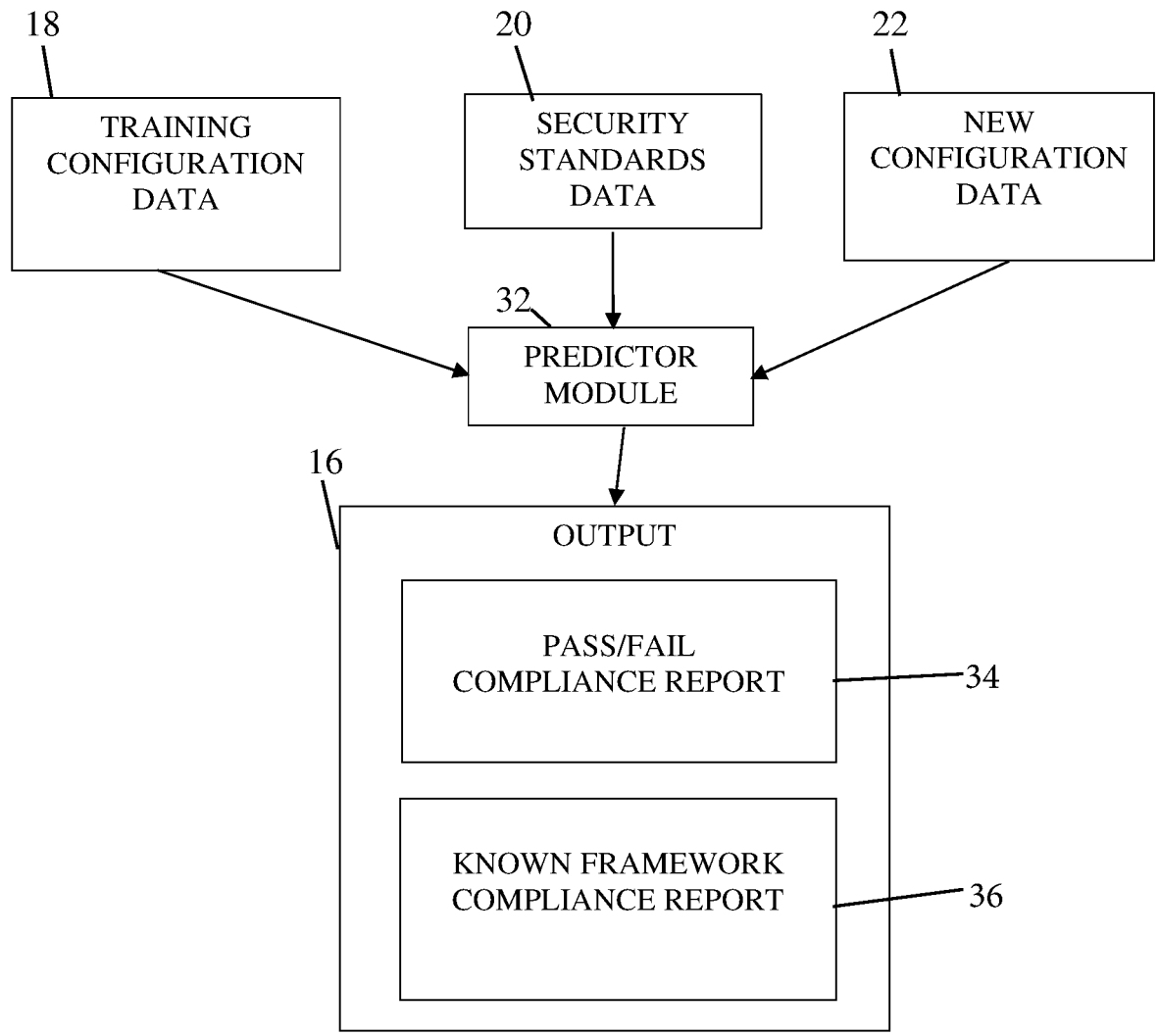
FIG. 2 illustrates a diagram of a portion of the system of FIG. 1, according to an embodiment.

As shown in FIG. 1, the system 10 includes a computer 12 operatively connected to a database 14 for processing the data therein to generate a report 16 which can be displayed, printed, or otherwise output to a user or other systems. As shown in FIG. 2, the report 16 can include a compliance report indicating a pass state or a fail state of the new configuration data 22, and alternatively or in addition, can include a known framework compliance report. The database 14 includes old configuration data as training configuration data 18, security standards data 20, and new configuration data 22, each of which is transmitted or otherwise accessed by the computer 12 through an input device 24. The database 14 can include multiple separate databases or data sources for storing or otherwise providing the training configuration data 18, security standards data 20, and new configuration data 22 separately or together.

In an example of configuration data, a newly commissioned system having associated new configuration data can use a ten character alphanumeric password, while the training data from old configurations has eight character alphanumeric password, which can be a company standard of previous configurations. Also, a security standard such as PCI requires only a seven character alphanumeric password. The system 10 takes into consideration both security standards and old configuration data, and decides the current configuration state of the newly commissioned system is a pass since the password strength of the newly commissioned system exceeds both requirements of PCI and of the old configuration data. In an alternative example, a strong encryption cipher does not fail the test when the strong encryption cipher is compared to a weaker cipher defined by old configuration standards or security standards.

The input device 24 can be a communication interface or an input port, or other known physical input mechanisms. The input device 24 can be connected to the database 14 through a network, such as the Internet. The computer 12 also includes a processor 26 connected to the input device 24 and to an output device 28. The processor 26 can be a microprocessor, a specialized processor such as an application specific integrated circuit (ASIC), or any other known physical hardware as the processor 26. The output device 28 can be a display, a printer, or other known devices for generating and outputting the report 16 for use by a user or by other systems or devices. The report 16 could be physically displayed by a display of the output device 28, or physically printed by a printer as the output device 28. The computer 12 can also include a memory 30, such as random access memory (RAM) or other known types of physical memory devices, for temporarily or permanently storing the data 18, 20, 22. In addition, the memory 30 can store prediction parameters used by a predictor module 32, as described below. Furthermore, the report 16 can be a data structure physically stored in the memory 30.

The predictor module 32 is trained by the training configuration data 18 and the security standards data 20 to become a classifier, which can classify the new configuration data 22 to either pass or fail meeting the security standards data 20. The classifier of the predictor module 32 can be a binary classifier to specify a pass state or a fail state of the new configuration data 22. In particular, the classifier of the predictor module 32 can be a logistic regression classifier which uses logistic regression to perform the binary classification of the new configuration data 22. Alternatively or in addition, the predictor module 32 can be implemented by an artificial neural network (ANN) having a plurality of nodes arranged in at least one layer, with interconnections between the nodes. The nodes and interconnections are configured through training by the training configuration data 18 and the security standards data 20.

Upon application to the ANN of the old configuration data as the training configuration data 18, the nodes and interconnections therebetween are configured to be a classifier for performing logistic regression of input data representing the new configuration data, which is input to the input device 24. The trained ANN receives the new configuration data 22 at an input node or an input layer to generate the pass state or fail state at an output node or an output layer of the ANN as the report 16. The arrangement of nodes and layers, as well as their interconnections, can be stored in the memory 30 as prediction parameters. Other known machine learning techniques such as support vector machine (SVM) learning can be used to implement the predictor module 32.

As shown in FIG. 2, the output 16 can be a pass/fail compliance report 34, which indicates whether the new configuration data 22 passes the security standards 20 or fails the security standards 20. Alternatively, the output 16 can be a known framework compliance report 36, which indicates whether the new configuration data 22 passes a known framework such as a specific security standard or fails the known framework. The specific security standard can be selected from known and predetermined security standards such as PCI, SOCX, GDPR, HIPPA, CIS, NIST, and ISO 27001.

The pass state and the fail state can be specified by state parameters which can be stored in the processor 26. Alternatively, the state parameters can be stored in the memory 30. For example, the prediction module 32 can generate a physical data structure as the state parameters stored in a data file in the processor 26. Otherwise, the physical data structure can be stored in a data file in the memory 30. Such physical data structure with the state parameters can then be conveyed to the output device 28 which generates the report 16 indicating the pass state or the fail state. The state parameters can specify in detail the reasons which cause a new configuration to pass or fail. For example, the state parameter can store the pass or fail outcome for each test which can be later used cumulatively as a report. Such state parameters can then be reviewed by an administrator. In an example scenario, in the event that the new configuration data fails relative to at least one predetermined security standard, an administrator can review the state parameters of the failing new configuration data. The state parameters then provide the administrator with the opportunity to correct the new configuration data to meet the predetermined security standard prior to deployment of the new configuration data.

Figure 3:
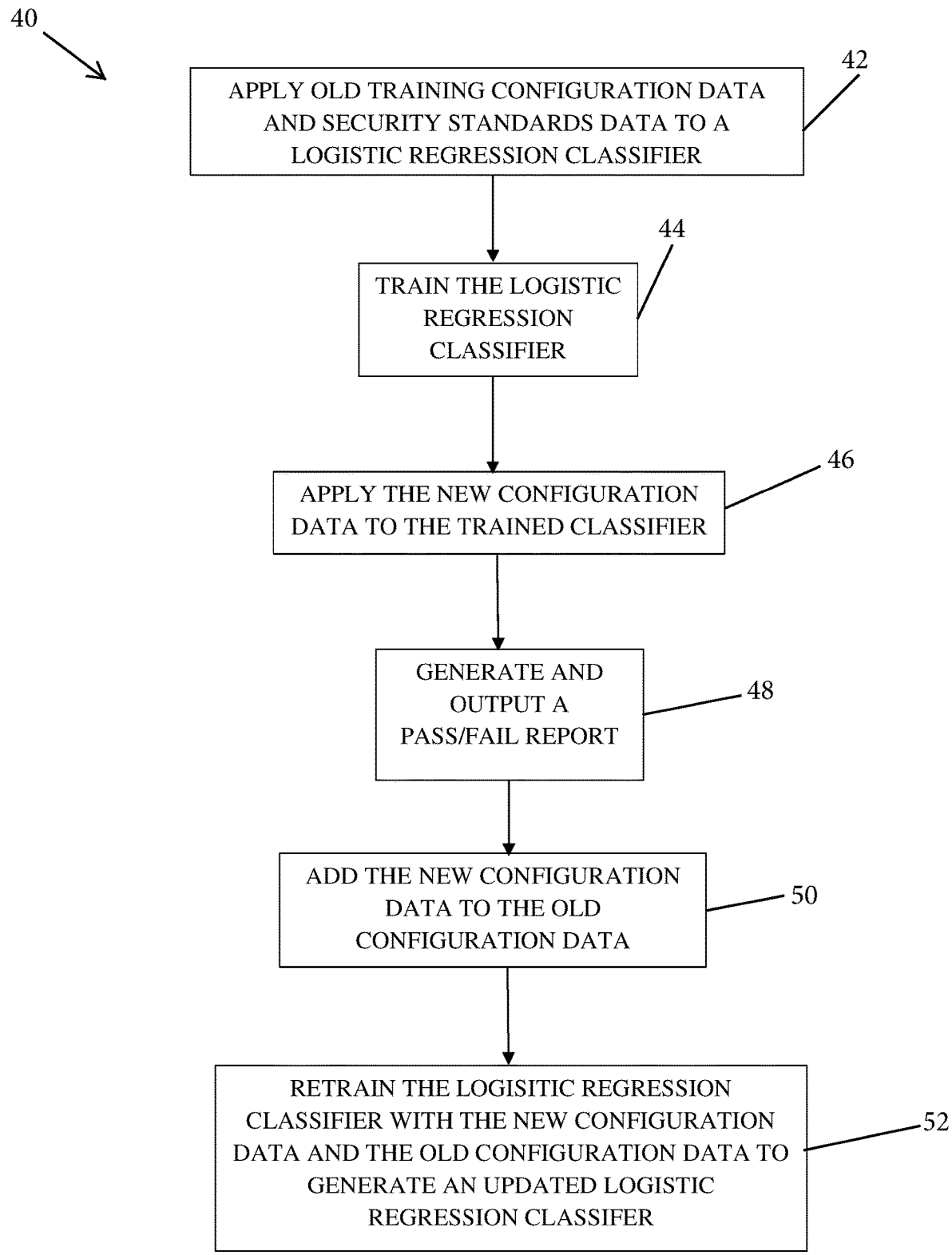
FIG. 3 illustrates a flowchart of a method, according to an embodiment.

Referring to FIG. 3, a method 40 uses the system 10 of FIGS. 1-2 in performing steps 42-52. In step 42, the method applies the old training configuration data 18 and the security standards data 20 to the logistic regression classifier implemented by the predictor module 32. In step 44, the method then trains the logistic regression classifier. In step 46, the method applies the new configuration data 22 to the trained classifier. In step 48, the method generates and outputs a pass/fail report in a compliance report 34 or in a known framework compliance report 36. For example, if the new configuration data 22 is a compliant configuration relative to a known security standard 20 as a known or predetermined framework, the compliance report 34 or the known framework compliance report 36 generates a pass message as the outputted report 16. However, if the new configuration data 22 has a misconfiguration relative to a known security standard 20, the compliance report 34 or the known framework compliance report 36 generates a fail message as the outputted report 16.

Referring again to FIG. 3, the method 40 can also incorporate the new configuration data for future classifications. In step 50, the method 40 adds the new configuration data to the old configuration data, and in step 52, the logistic regression classifier of the prediction module 32 is retrained with the combination of the old and new configuration data to generate an updated logistic classifier, thus incorporating the new configuration data for future logistic regression and classification of any future configuration data. For example, the prediction module 32 can include an ANN with nodes and interconnections therebetween formed by such training. Upon application of both the old configuration data and the new configuration data to the ANN, the nodes and interconnections therebetween are reconfigured to be an updated classifier for performing logistic regression of future input data representing future configuration data, which is input to the input device 24. Any new configuration data can be continually added to older configuration data to constantly train the prediction module 32.

Thus, by combining machine learning with configuration monitoring, the system 10 and method 40 minimizes errors and false positives in determining misconfigurations in the new configuration data 14. The system 10 and method 40 also perform the determination of misconfigurations in the new configuration data 14 with greater accuracy. Such greater accuracy aids a system administrator to swiftly decide whether to implement or not implement such new configuration data based on the output report 16. The analysis of new configuration data 14 as complying or not complying with security standards 20 has reduced complexity when performed by the system 10 and method 40 compared to human-based analysis, which speeds up the determination and results of such analysis.

Portions of the methods described herein can be performed by software or firmware in machine readable form on a tangible (e.g., non-transitory) storage medium. For example, the software or firmware can be in the form of a computer program including computer program code adapted to cause the computer-based configuration monitoring system and method to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor, or on other known hardware, such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations

What is claimed is:

1. A method comprising:
receiving old configuration data, industry security standards data, and new configuration data at an input device, wherein the new configuration data is associated with a newly commissioned system;
training an artificial neural network of a predictor module of a processor using the old configuration data and the industry security standards data as training data to perform a logistic regression, wherein the artificial neural network has a plurality of nodes arranged in at least one layer with interconnections between the nodes, and wherein the nodes and interconnections are configured through the training using the old configuration data and the industry security standards data;
generating a binary classification of the new configuration data as having a binary state being only a pass state or a fail state,
wherein the pass state indicates that the new configuration data of the newly commissioned system exceeds the requirements of both the old configuration data and the industry security standards data, and
wherein the fail state indicates that the new configuration data of the newly commissioned system does not exceed the requirements of both of the old configuration data and the industry security standards data;
generating a state parameter specifying a reason which causes the new configuration data to pass or fail; and
outputting, at an output device, a classification report including the reason and the binary classification indicating only the pass state or the fail state of the new configuration data.

2. The method of claim 1, further comprising:
storing the old configuration data, the industry security standards data, and the new configuration data in a database.

3. The method of claim 1, wherein the output device outputs the pass state or the fail state in a pass/fail compliance report as the classification report.

4. The method of claim 1, wherein the industry security standards data includes a predetermined framework; and
wherein the output device outputs the pass state or the fail state in a framework compliance report as the classification report, with the pass state or the fail state being relative to the predetermined framework.

5. The method of claim 1, further comprising:
adding the new configuration data to the old configuration data to be supplemental configuration data.

6. The method of claim 5, further comprising:
retraining the artificial neural network with the supplemental configuration data to update the logistic regression of future configuration data.

7. A classifier comprising:
a processor having a predictor module including an artificial neural network, wherein the artificial neural network has a plurality of nodes arranged in at least one layer with interconnections between the nodes, and wherein the nodes and interconnections are configured through training using old configuration data and industry security standards data to perform a logistic regression, for receiving new configuration data associated with a newly commissioned system, and for generating a binary classification of the new configuration data as having a binary state being only a pass state or a fail state,
wherein the predictor module generates a state parameter specifying a reason which causes the new configuration data to pass or fail,
wherein the pass state indicates that the new configuration data of the newly commissioned system exceeds the requirements of both the old configuration data and the industry security standards data, and
wherein the fail state indicates that the new configuration data of the newly commissioned system does not exceed the requirements of both of the old configuration data and the industry security standards data; and
an output device outputting a classification report including the reason and the binary classification indicating only the pass state or the fail state of the new configuration data.

8. The classifier of claim 7, wherein the classification report is a pass/fail compliance report.

9. The classifier of claim 7, wherein the industry security standards data includes a predetermined framework; and
wherein the output device outputs the pass state or the fail state in the classification report as a framework compliance report with the pass state or the fail state being relative to the predetermined framework.

10. The classifier of claim 7, wherein the processor adds the new configuration data to the old configuration data to be supplemental configuration data.

11. The classifier of claim 10, wherein the processor retrains the artificial neural network with the supplemental configuration data to update the logistic regression of future configuration data.

12. A computer-based configuration monitoring system comprising:
an input device for receiving old configuration data, industry security standards data, and new configuration data, wherein the new configuration data is associated with a newly commissioned system;
a processor including a predictor module having an artificial neural network, wherein the artificial neural network has a plurality of nodes arranged in at least one layer with interconnections between the nodes, and wherein the nodes and interconnections are configured through training using the old configuration data and the industry security standards data, to perform a logistic regression for generating a binary classification of the new configuration data as having a binary state being only a pass state or a fail state,
wherein the predictor module generates a state parameter specifying a reason which causes the new configuration data to pass or fail,
wherein the pass state indicates that the new configuration data of the newly commissioned system exceeds the requirements of both the old configuration data and the industry security standards data, and
wherein the fail state indicates that the new configuration data of the newly commissioned system does not exceed the requirements of both of the old configuration data and the industry security standards data; and
an output device outputting a classification report including the reason and the binary classification indicating only the pass state or the fail state of the new configuration data.

13. The computer-based configuration monitoring system of claim 12, wherein the output device is a display for displaying the classification report.

14. The computer-based configuration monitoring system of claim 12, further comprising:
 a database for storing the old configuration data, the industry security standards data, and the new configuration data.

15. The computer-based configuration monitoring system of claim 12, wherein the output device outputs only the pass state or the fail state in a pass/fail compliance report as the classification report.

16. The computer-based configuration monitoring system of claim 12, wherein the industry security standards data includes a predetermined framework; and
 wherein the output device outputs only the pass state or the fail state in a framework compliance report as the classification report, with the pass state or the fail state being relative to the predetermined framework.

17. The computer-based configuration monitoring system of claim 12, wherein the processor adds the new configuration data to the training configuration data to be supplemental configuration data, and retrains the artificial neural network with the supplemental configuration data to update the logistic regression of future configuration data.

\* \* \* \* \*